(12) United States Patent
Crine et al.

(10) Patent No.: US 10,808,808 B2
(45) Date of Patent: Oct. 20, 2020

(54) EXPANDING PIN ASSEMBLY CONTROLLED BY ACTUATOR FOR LOCKING AND UNLOCKING MECHANICAL JOINT

(71) Applicant: Sierra Nevada Corporation, Sparks, NV (US)

(72) Inventors: Jake Crine, Denver, CO (US); Benjamin Paul Cunningham, Arvada, CO (US); Alec B. Devereaux, Denver, CO (US); Sonny J. Lewis, Golden, CO (US); Jonathan Peritt, Broomfield, CO (US)

(73) Assignee: Sierra Nevada Corporation, Sparks, NV (US)

( * ) Notice: Subject to any disclaimer, the term of this patent is extended or adjusted under 35 U.S.C. 154(b) by 690 days.

(21) Appl. No.: 15/587,945

(22) Filed: May 5, 2017

(65) Prior Publication Data

US 2018/0320767 A1 Nov. 8, 2018

(51) Int. Cl.
| | | |
|---|---|---|
| *F16B 13/04* | (2006.01) | |
| *F16H 19/02* | (2006.01) | |
| *B64C 3/56* | (2006.01) | |
| *F16H 25/22* | (2006.01) | |
| *F16H 57/08* | (2006.01) | |

(52) U.S. Cl.
CPC ............... *F16H 19/02* (2013.01); *B64C 3/56* (2013.01); *F16H 25/2252* (2013.01); *B64C 2201/102* (2013.01); *F16H 57/082* (2013.01)

(58) Field of Classification Search
CPC .... F16H 19/02; F16H 25/2252; F16H 57/082; B64C 2201/102; B64C 3/56; F16B 13/068
See application file for complete search history.

(56) References Cited

U.S. PATENT DOCUMENTS

| 1,120,368 | A | | 12/1914 | Booraem et al. | |
|---|---|---|---|---|---|
| 2,968,205 | A | * | 1/1961 | Springate | F16B 21/165 411/348 |
| 3,192,820 | A | | 7/1965 | Pitzer | |
| 4,078,471 | A | | 3/1978 | Archibald et al. | |
| 5,193,956 | A | * | 3/1993 | Duran | F16B 13/068 411/33 |
| 5,201,479 | A | * | 4/1993 | Renzelmann | B64C 3/56 244/49 |
| 5,310,138 | A | * | 5/1994 | Fitzgibbon | B64C 3/56 244/49 |
| 5,381,986 | A | * | 1/1995 | Smith | B64C 3/56 244/49 |

(Continued)

OTHER PUBLICATIONS

*Expandable Diameter Fasteners Catalog.* Shur-Lok, 2007. Web. Date accessed Jul. 25, 2017. 17 pages.

*Primary Examiner* — Matthew R McMahon
(74) *Attorney, Agent, or Firm* — Mintz Levin Cohn Ferris Glovsky and Popeo, P.C.

(57) ABSTRACT

An expanding pin system is described that can provide automated and/or power controlled locking and unlocking of an expanding pin assembly in a mechanical joint. For example, the expanding pin system can include an actuation assembly that includes a single actuator (e.g., motor) to control an expanding pin assembly for locking and unlocking a mechanical joint.

24 Claims, 9 Drawing Sheets

(56) References Cited

U.S. PATENT DOCUMENTS

| | | | | |
|---|---|---|---|---|
| 5,427,329 | A * | 6/1995 | Renzelmann | B64C 3/56 244/49 |
| 6,260,798 | B1 * | 7/2001 | Casiez | B64C 3/56 244/49 |
| 8,733,692 | B2 * | 5/2014 | Kordel | B64C 23/072 244/49 |
| 8,823,229 | B2 * | 9/2014 | Brieschke | F16H 25/20 310/12.19 |
| 9,211,946 | B2 * | 12/2015 | Good | B64C 3/56 |
| 9,499,252 | B2 * | 11/2016 | Lassen | B64C 3/56 |
| 9,914,524 | B2 * | 3/2018 | Good | F15B 11/003 |
| 2007/0169578 | A1 * | 7/2007 | Christensen | F16H 25/2021 74/89.37 |

* cited by examiner

EXPANDING PIN ASSEMBLY CONTROLLED BY ACTUATOR FOR LOCKING AND UNLOCKING MECHANICAL JOINT

TECHNICAL FIELD

The subject matter described herein relates to an expanding pin assembly that is controlled by an actuation assembly for releasably locking a mechanical joint.

BACKGROUND

Expanding pins can be used, for example, to releasably lock a mechanical joint. The releasable aspect of the expanding pin can be useful for mechanical joints that are not intended to be permanently locked. For example, an aircraft having a deployable wing can benefit from the use of an expanding pin at a wing joint to allow the deployable wing to be deployed, such as for flying the aircraft, and retracted, such as for storage of the aircraft. Currently available expanding pins require manual labor to insert and expand an expanding pin to thereby lock a mechanical joint, as well as require manual labor to collapse and retract the expanding pin to thereby unlock the mechanical joint. For example, a user can use a tool and/or integrated cam lock mechanism to lock and unlock the expanding pin in the mechanical joint. Such user interaction can be cost and time inefficient, as well as introduce human error.

SUMMARY

Aspects of the current subject matter can include various embodiments of an expanding pin system for releasably locking a mechanical joint associated with a deployable wing of an aircraft to thereby releasably secure the deployable wing in a deployed position. In one aspect, the expanding pin system can include an actuation assembly configured to provide a first output for locking the mechanical joint and a second output for unlocking the mechanical joint. The expanding pin system can further include a pin driving assembly operably coupled to the actuation assembly. The pin driving assembly can include a drive assembly having a carrier operably coupled to the actuation assembly and an outer housing such that the carrier translates a first distance along the housing when the actuation assembly is actuated to provide the first output. The drive assembly can further include a sun gear operably coupled to the carrier such that the sun gear is caused to rotate in a first direction after the carrier translates the first distance. The pin driving assembly can further include an expanding pin assembly operably coupled to the drive assembly such that the expanding pin assembly can translate the first distance with the drive assembly thereby advancing an expandable part of the expanding pin assembly across at least a part of the mechanical joint. The expandable part can be caused to expand when the sun gear rotates in the first direction.

In some variations one or more of the following features can optionally be included in any feasible combination. The sun gear can be configured to rotate in a second direction when the actuation assembly is actuated to provide the second output to thereby cause the expandable part to contract. The carrier can be configured to translate along the housing thereby causing the expandable part to retract from the mechanical joint when the actuation assembly is actuated to provide the second output.

In some implementations, the actuation assembly can include one or more of a DC brush motor, a DC brushless motor, a stepper motor, an AC motor, and a rotary hydraulic actuator. The outer housing can include an inner chamber with an inner wall that is threadably engaged with a ring gear positioned around a distal end of the carrier such that rotation of the carrier causes rotation of the ring gear. Furthermore, rotation of the ring gear can cause translation of the drive assembly and the expanding pin assembly relative to the outer housing. The pin driving assembly can further include a detent feature that, when in an engaged position, is operatively coupled to both the drive assembly and the expanding pin assembly to thereby restrict translation of the expanding pin assembly relative to the drive assembly. The detent feature, when in a disengaged position, can be uncoupled from the drive assembly to thereby allow translation of the expanding pin assembly relative to the drive assembly. The pin driving assembly can further include a plunger that is biased in a distal position within the pin driving assembly thereby causing the detent feature to be in the engaged position, and wherein the plunger causes the detent feature to be in the disengaged position when forced in a proximal position. The housing can further include a pin aligned with a distal end of the plunger. The pin can be configured to force the plunger from the distal position to the proximal position when the pin driving assembly engages the pin during distal translation of the pin driving assembly.

In some implementations, the expanding pin assembly can further include a shear pin that is rotationally restricted and threadably engaged with the sun gear such that rotation of the sun gear causes translation of the shear pin. The expandable part can be positioned along a distal end of the shear pin. Translation of the shear pin in a proximal direction relative to the sun gear can cause the expandable part to expand and translation of the shear pin in a distal direction relative to the sun gear can cause the expandable part to contract. The expandable part can include one or more bushings.

In another interrelated aspect of the current subject matter, a method of an expanding pin system coupled to a mechanical joint associated with a deployable wing of an aircraft is described. The method can include actuating an actuation assembly of the expanding pin system to provide a first output, and the actuation assembly can be operatively coupled to a pin driving assembly of the expanding pin system that is configured to releasably lock the mechanical joint. The method can further include advancing, as a result of the first output, an expandable part of the pin driving assembly into the mechanical joint and expanding, as a result of the first output, the expandable part in the mechanical joint to thereby lock the mechanical joint. In some variations, the method can further include actuating the actuation assembly to provide a second output and collapsing, as a result of the second output, the expandable part in the mechanical joint. The method can further include retracting, as a result of the second output, the expandable part from the mechanical joint thereby unlocking the mechanical joint. In some variations, the method can include disengaging, as a result of the advancing, a detent feature of the pin driving assembly to allow the expanding and engaging, as a result of the retracting, the detent feature to allow the collapsing.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Devices, systems, and methods are provided for automated and/or power controlled locking and unlocking of an expanding pin assembly in a mechanical joint. While current technology requires manual control of an expanding pin to lock and/or unlock a mechanical joint, the devices, systems, and methods disclosed herein allow an actuation assembly, which can include a single actuator (e.g., motor), to control an expanding pin assembly for locking and unlocking a mechanical joint.

In one exemplary embodiment, an expanding pin system is provided for controlling the locking and unlocking of a mechanical joint (e.g., single or double shear joint). The expanding pin system can include a pin driving assembly that is operably controlled by an actuation assembly and a drive assembly. When actuated, the actuation assembly can cause the drive assembly to advance and expand the pin driving assembly in the mechanical joint to thereby lock the mechanical joint or contract and retract the pin driving assembly from the mechanical joint to thereby unlock the mechanical joint. As such, the expanding pin system described herein does not rely on human interaction and control for locking or unlocking a mechanical joint thereby improving efficiency and removing human error. Other embodiments are within the scope of the disclosed subject matter.

Figure 1A:
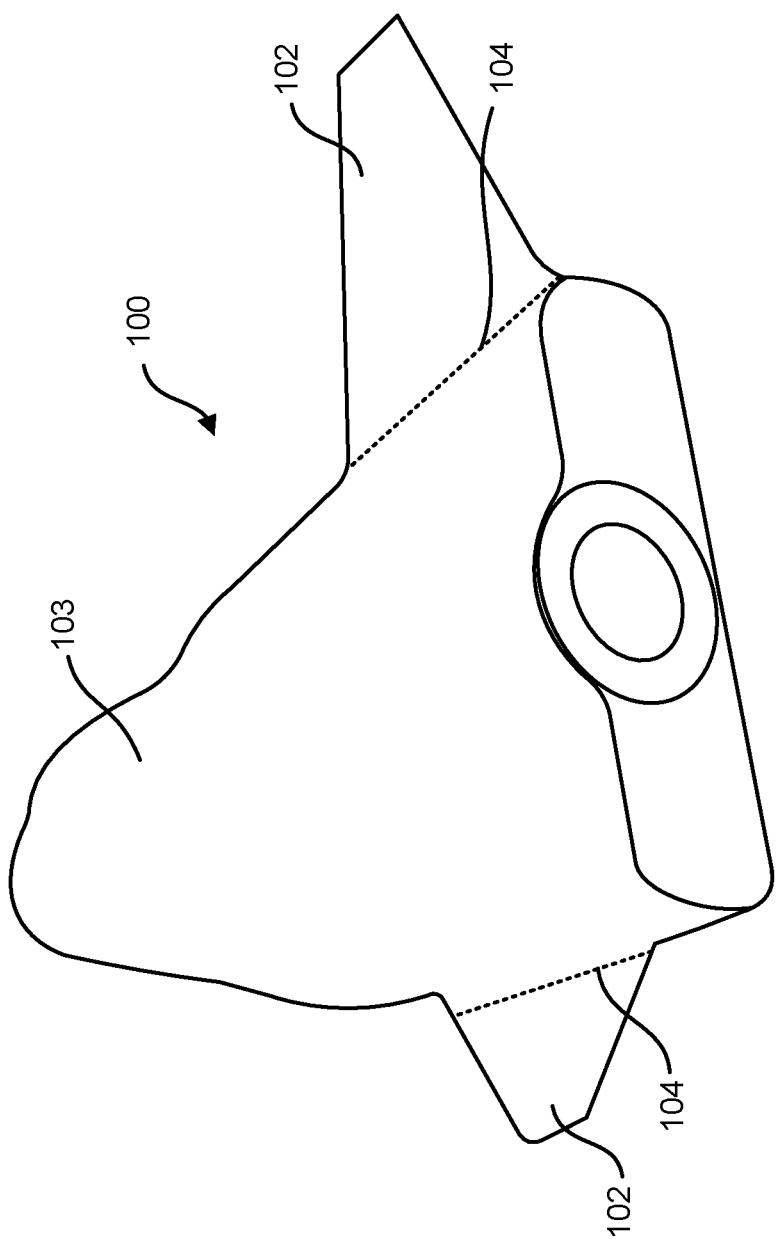
FIG. 1A illustrates a perspective view of an aircraft having deployable wings.

FIG. 1A illustrates an aircraft 100 having deployable wings 102 extending from an aircraft body 103. Each of the deployable wings 102 can form a deployed position, as shown in FIG. 1A, and a retracted position relative to the aircraft body 103. For example, the deployable wings 102 can allow the aircraft 100 to be stored in a smaller compartment when the deployable wings 102 are in the retracted position. Furthermore, when in the deployed position, the deployable wings 102 can allow the aircraft 100 to fly. In some instances, the deployable wings 102 are deployed and retracted more than one time such that it is beneficial to allow the deployable wings 102 to be releasably secured in either the deployed or retracted position.

As shown in FIG. 1A, a wing joint 104 can allow a respective deployable wing 102 to move between the deployed and retracted positions. Due to the importance of the structural integrity of the deployable wings 102 when in the deployed position, particularly during flight, the wing joints 104 need to be secured such that the deployable wings 102 are securely maintained in the deployed position. However, it is also beneficial to efficiently release the wing joints 104 to allow for the deployable wings 102 to be moved into the retracted position, such as for storage of the aircraft 100.

Figure 1B:
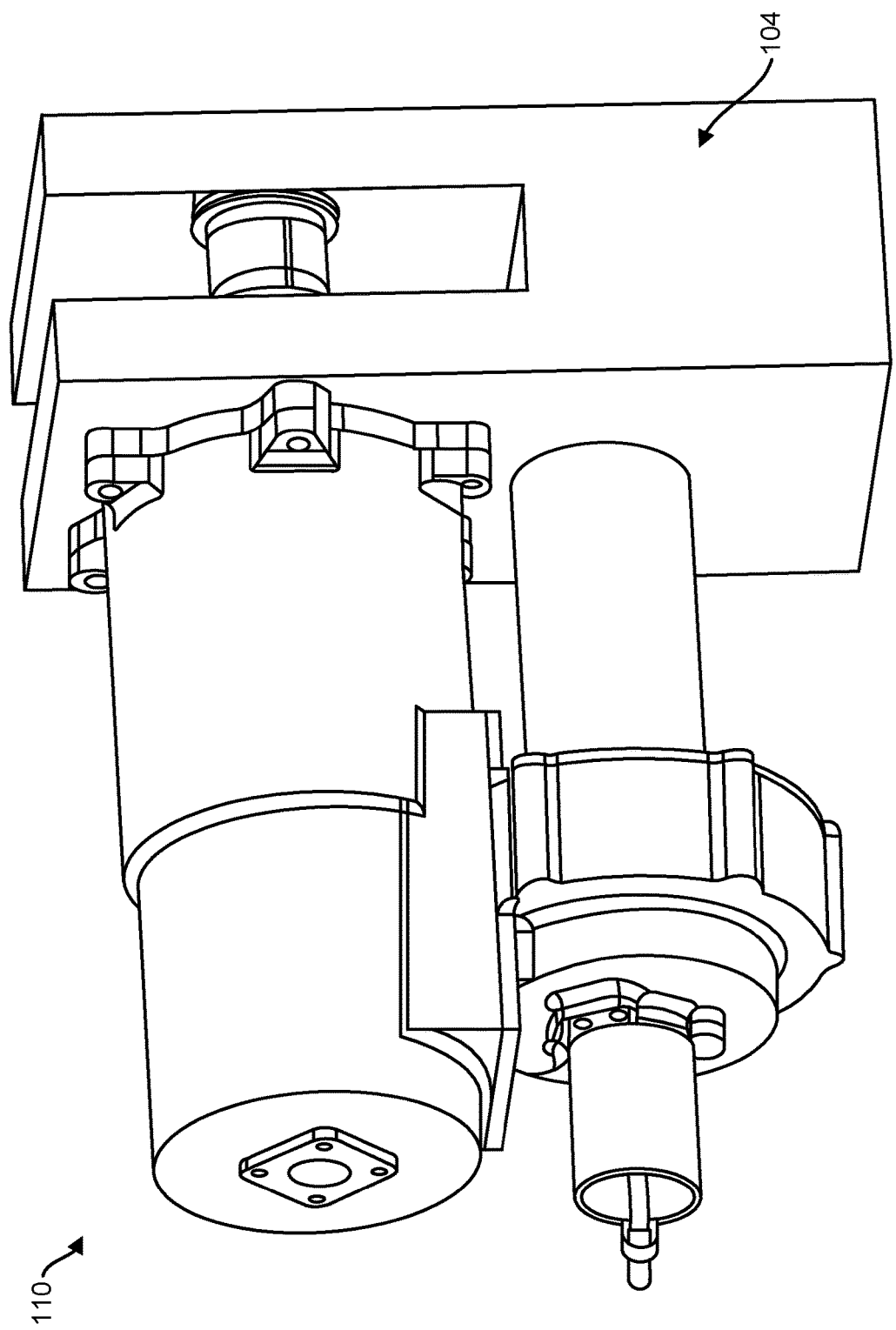
FIG. 1B illustrates a partial view of an embodiment of an expanding pin system consistent with implementations of the current subject matter operably coupled to a wing joint of the aircraft for releasably securing a deployable wing of the aircraft in a deployed position.

FIG. 1B illustrates an embodiment of an expanding pin system 110 operably coupled to the wing joint 104 of the aircraft 100 for releasably securing the associated deployable wing 102 in the deployed position. As will be described in greater detail below, the expanding pin system 110 can lock and unlock the wing joint 104 without human interaction thereby improving the efficiency of securing the deployable wings 102 in the deployed position, as well as improving the efficiency of releasing the deployable wings 102 into the retracted position. Although the expanding pin system 110 is shown and described herein as being used in an aircraft having deployable wings, the expanding pin system 110 can be used in any number of a variety of systems and devices having a mechanical joint that can benefit from being releasably locked. For example, the expanding pin system can be used in aircraft structural doors and hatches.

Figure 2:
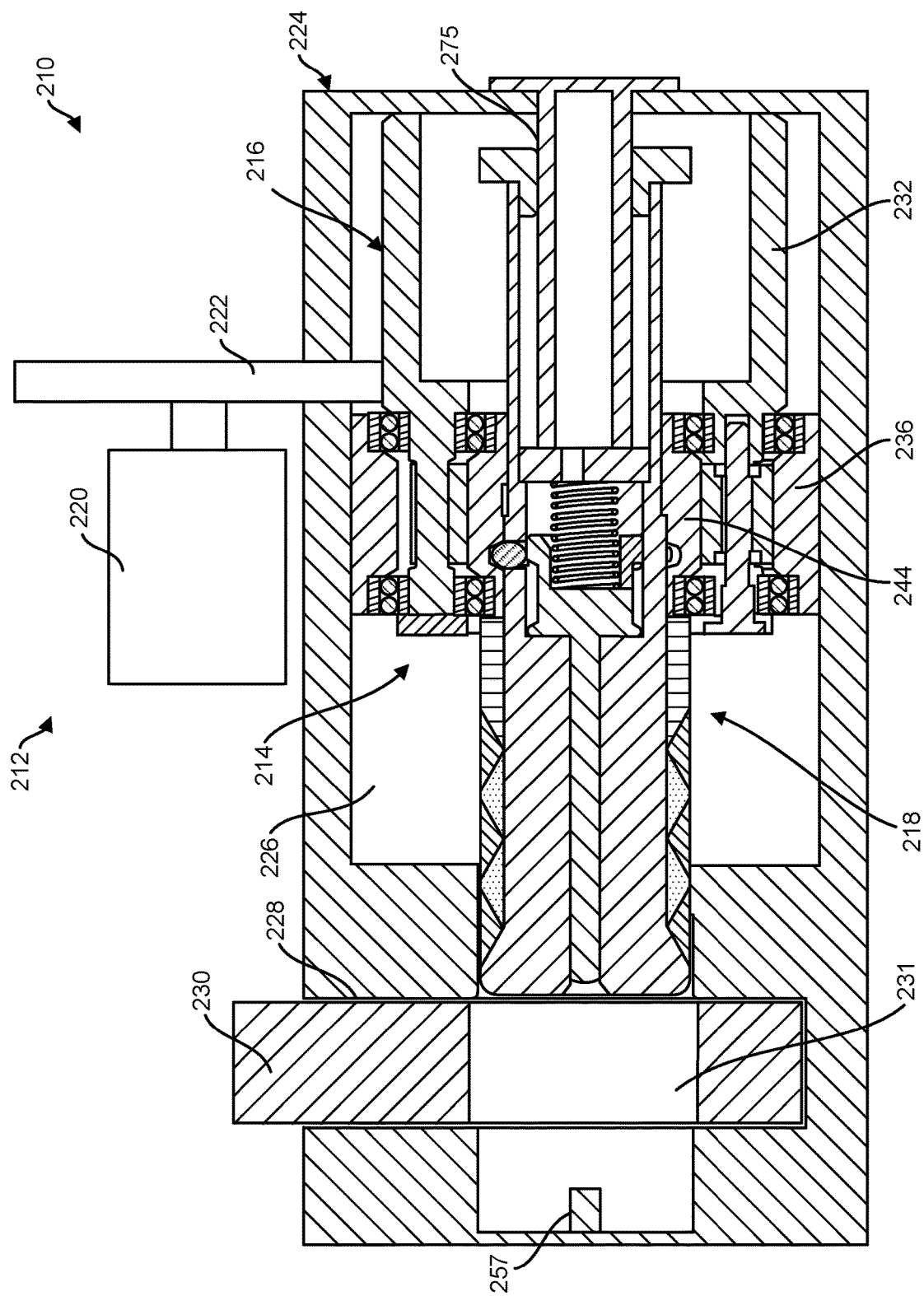
FIG. 2 illustrates a cross-section side view of an embodiment of the expanding pin system including an actuation assembly operably coupled to a pin driving assembly with the pin driving assembly including a drive assembly coupled to an expanding pin assembly.

FIG. 2 illustrates a cross-section view of an embodiment of the expanding pin system 210 including an actuation assembly 212 that is operably coupled to a pin driving assembly 214. The pin driving assembly 214 can include a drive assembly 216 that extends and secures an expanding pin assembly 218 in a mechanical joint (e.g., the wing joint 104) for locking the mechanical joint. The drive assembly 216 can also unsecure and retract the expanding pin assembly 218 from the mechanical joint to thereby unlock the mechanical joint, as will be described in greater detail below. As shown in FIG. 2, the actuation assembly 212 can include an actuator 220 that is operably coupled to an actuation coupler 222 (e.g., a pinion, lever, etc.). Any number of a variety of actuators 220 can be included, such as DC brush motors, DC brushless motors, stepper motors, AC motors, or rotary hydraulic actuators without departing from the scope of this disclosure. The actuation coupler 222 can be operably coupled to the pin driving assembly 214 such that actuation of the actuator 220 can cause the actuation coupler 222 to drive the pin driving assembly 214 thereby locking or unlocking the expanding pin assembly 218 in a mechanical joint.

In some embodiments, the pin driving assembly 214 can include a housing 224 that includes an inner chamber 226 sized and shaped to contain the drive assembly 216 and expanding pin assembly 218, as shown in FIG. 2. For example, the inner chamber 226 can have a tubular shape, however, the inner chamber 226 can have any of a variety of shapes. As shown in FIG. 2, the housing 224 can include an opening 228 that extends through an outer wall and perpendicular to a longitudinal axis of the housing 224. The opening 228 can be configured to allow a mating part 230 of the mechanical joint to extend into the housing 224. In some implementations, when the mating part 230 extends through the opening 228 and into the housing 224, the mating part 230 can be securely coupled to the expanding pin system 210 thereby locking the associated mechanical joint.

For example, as shown in FIG. 2, the expanding pin assembly 218 can extend along the longitudinal axis of the housing 224 such that when the mating part 230 extends through the opening 228 and into the housing 224, the expanding pin assembly 218 can be advanced into and expand within a mating part though-hole 231 of the mating part 230. This can lock the mating part 230 relative to the housing 224 thereby locking the mechanical joint. In some implementations, the housing 224 can be part of the overall device or system to which the expanding pin system 210 is a part of. For example, the housing can be a part of the deployable wing 102 of the aircraft 100.

Figure 3:
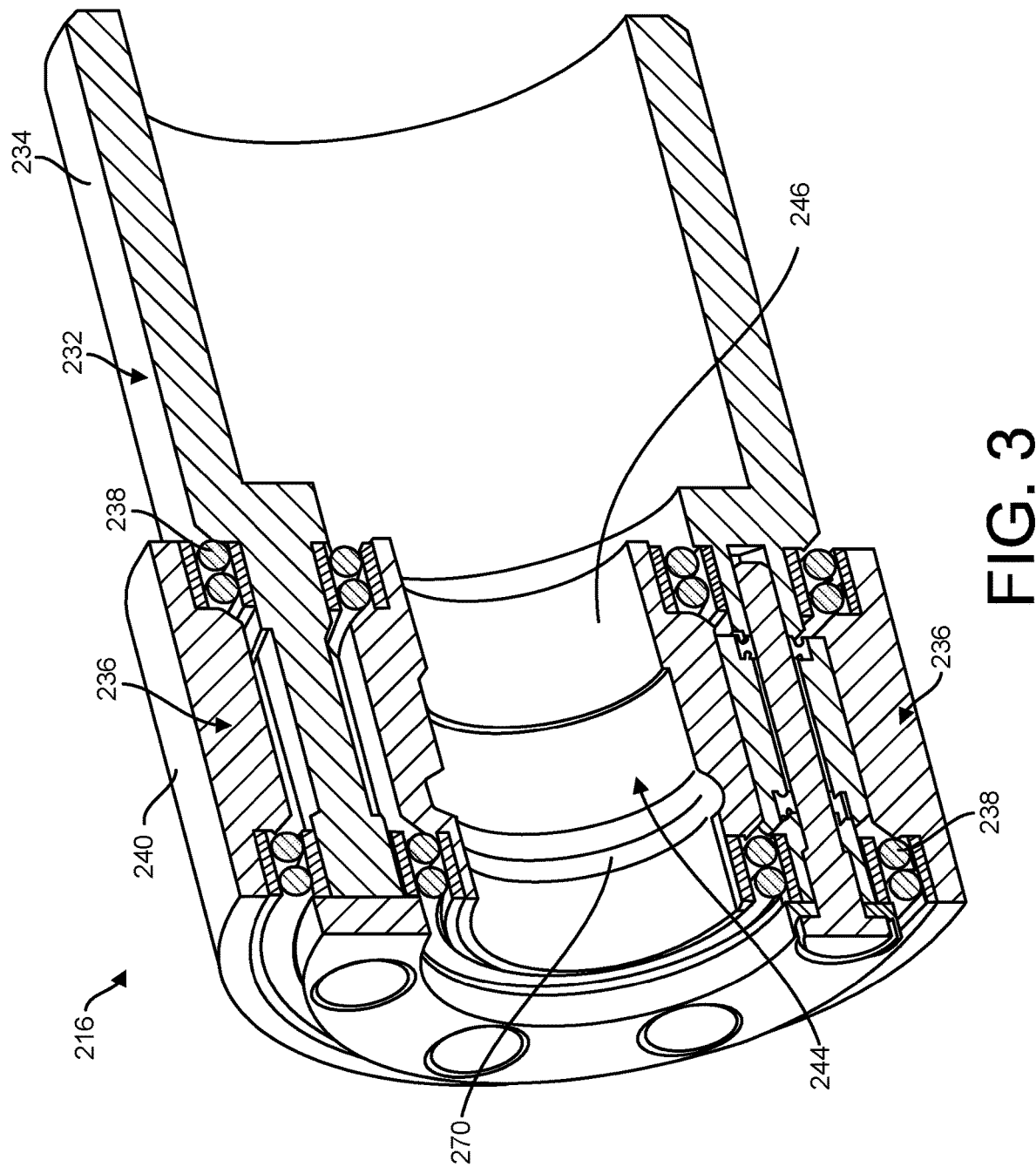
FIG. 3 illustrates a cross-section perspective view of the drive assembly of FIG. 2.

FIG. 3 illustrates a cross-section view of the drive assembly 216, which includes a carrier 232 having an elongated tubular body. In some implementations, an outer surface 234 of a proximal end of the carrier 232 can include one or more engaging features (e.g., threads, splines) that can engage with complimenting engaging features along the actuation coupler 222. Such engagement between the actuation coupler 222 and the carrier 232 can allow the actuation coupler 222 to cause the carrier 232 to rotate upon actuation of the actuator 220.

As shown in FIG. 3, the drive assembly 216 can include a ring gear 236 having a tubular shape and positioned around a distal end of the carrier 232. At least one bearing 238 can be positioned between the carrier 232 and the ring gear 236, such as a proximal and distal pair of bearings 238. The bearings 238 can assist with axially aligning the ring gear 236 relative to the distal end of the carrier 232 and transferring rotational movement of the carrier 232 to the ring gear 236 thereby causing the ring gear 236 to rotate. The drive assembly 216 can further include a sun gear 244 having a tubular shape and positioned within the carrier 232. At least one bearing 238 can be positioned between the sun gear 244 and the carrier 232 to assist with axially aligning the sun gear 244 relative to the carrier 232 and transferring rotational movement of the carrier 232 to the sun gear 244 thereby causing the sun gear 244 to rotate. In some implementations, rotation of the sun gear 244 is not allowed to occur at the same time the ring gear 236 rotates, and vice versa. As will be described in greater detail below, one or more features of the expanding pin system 210 can assist with controlling whether the sun gear 244 or ring gear 236 can rotate thereby assisting with the locking and unlocking of the mechanical joint.

In some implementations, an outer surface 240 of the ring gear 236 can include threads that can threadably engage complimenting threads along an inner surface of the inner chamber 226 of the housing 224. As such, rotation of the ring gear 236 due to rotation of the carrier 232 can cause translation of both the carrier 232 and ring gear 236 along the longitudinal axis of the housing. Furthermore, such translation of the carrier 232 and ring gear 236 can also translate the entire drive assembly 216 and expanding pin assembly 218 within the housing 224. This can assist with distally advancing the expanding pin assembly 218 for locking the mechanical joint, as well as proximally retracting the expanding pin assembly 218 for unlocking the mechanical joint, as will be described in greater detail below.

In some implementations, when the actuation assembly 212 is actuated to cause the actuation coupler 222 to provide a first output (e.g., rotation of a pinion gear in a first direction), the drive assembly 216 and expanding pin assembly 218 can be caused to travel a distance along the housing in the distal direction. In addition, when the actuation assembly 212 is actuated to cause the actuation coupler 222 to provide a second output (e.g., rotation of the pinion gear in a second direction), the drive assembly 216 and expanding pin assembly 218 can be caused to travel the same distance along the housing in the proximal direction.

Figure 4:
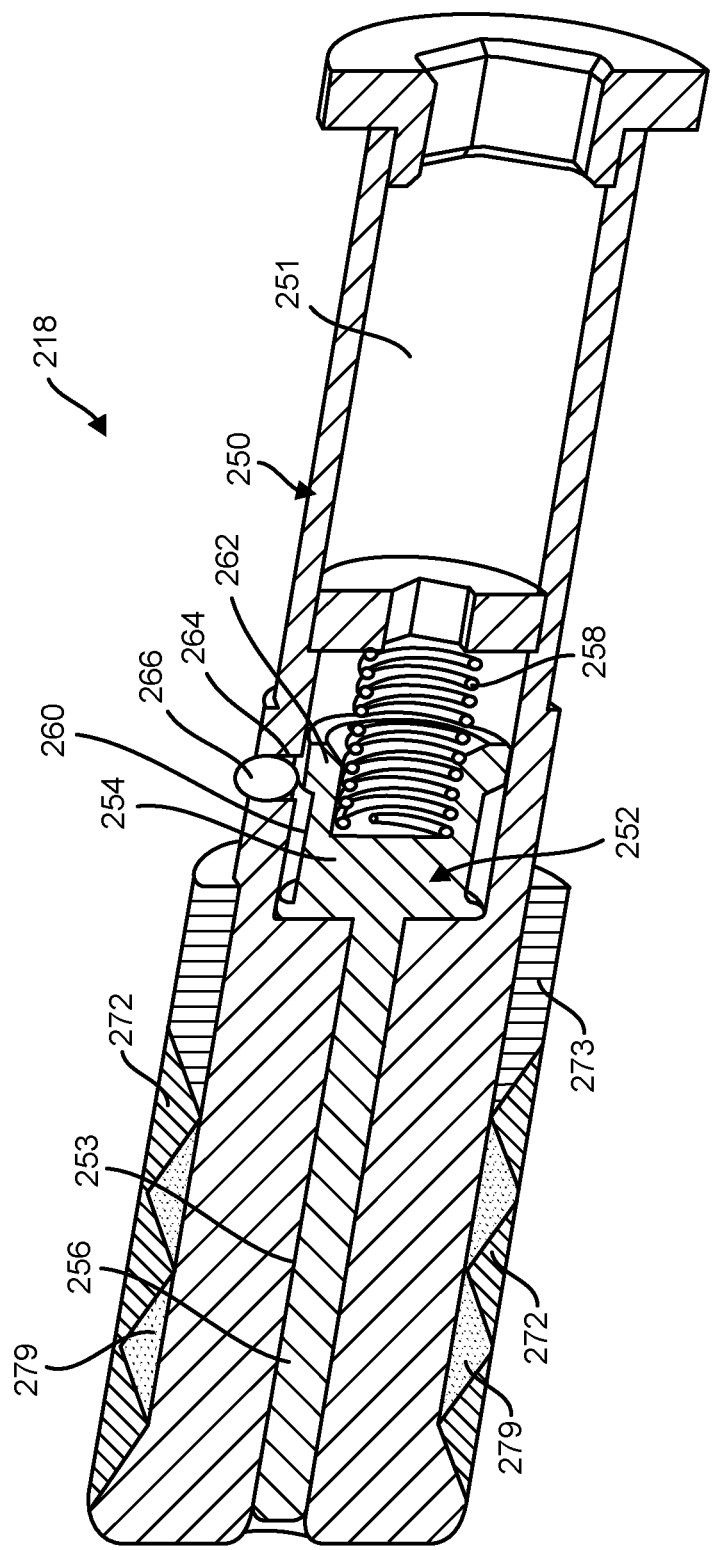
FIG. 4 illustrates a cross-section perspective view of the expanding pin assembly of FIG. 2.

As shown in FIG. 4, the expanding pin assembly 218 can include a shear pin 250 having an elongated tubular shape with a first inner chamber 251 and a second inner chamber 253 that are in communication with each other. The expanding pin assembly 218 can further include a plunger 252 having a head 254 and an elongated shaft 256, which can extend distally from the head 254. The head 254 can be sized and shaped to have a sliding engagement with the first inner chamber 251 of the shear pin 250, and the shaft 256 can be sized and shaped to have a sliding engagement with the second inner chamber 253 of the shear pin 250. The plunger 252 can include a recess 260 along an outer surface of the head 254 and an extruded lip 262 at a proximal end of the head 254. As shown in FIG. 4, the expanding pin assembly 218 can include a biasing member 258, such as a spring, that biases the plunger 252 to a distal position where a distal end of the head 254 of the plunger 252 contacts a distal end of the first inner chamber 251.

As shown in FIG. 4, the shear pin 250 can include at least one detent opening 264 that allows at least one detent feature 266 (e.g., a spherical ball) to travel therethrough. As shown in FIG. 2, the detent feature 266 can extend through the detent opening 264 when the plunger 252 is in the distal position. In this position, the extruded lip 262 of the plunger 252 can push the detent feature 266 through the detent opening 264 such that a part of the detent feature 266 extends out from an outer surface of the shear pin 250. When the plunger 252 is caused to move proximally away from the distal position, the detent feature 266 can depress into the detent opening 264 as the detent feature 266 is allowed to contact the recess 260 of the head 254 of the plunger 252. In some implementations, a force can be applied to the plunger 252 to cause the plunger 252 to move proximally thereby depressing the detent feature 266. For example, as shown in FIG. 2, a pin 257 that is aligned with a distal end of the shaft 256 of the plunger 252 can apply the force to the distal end of the shaft 256 when the expanding pin assembly 218 has sufficiently advanced in the distal direction to thereby cause the plunger 252 to move proximally and the detent feature 266 to become depressed, as will be described in greater detail below.

As shown in FIG. 2, when the detent feature 266 is in contact with the extruded lip 262, the detent feature 266 can engage a detent recess 270 along an inner surface of the sun gear 244 thereby preventing rotation of the sun gear 244 and translation of the shear pin 250 relative to the sun gear 244. When the detent feature 266 is in contact with the recess 260 of the head 254 of the plunger 252, the detent feature 266 no longer engages the detent recess 270 in the sun gear 244 thereby allowing rotation of the sun gear 244 and translation of the shear pin 250 relative to the sun gear 244. As will be discussed in greater detail below, by allowing the shear pin 250 to translate proximally relative to the sun gear 244, a collar 273 positioned along an outer surface of the shear pin 250 and distal to the sun gear 244 can be caused to distally advance along the shear pin 250. Such distal translation of the collar 273 along the shear pin 250 can cause one or more expandable features 272 (e.g., bushings) positioned along the outer surface of a distal end of the shear pin 250 to expand (e.g., due to being compressed between the collar 273 and a distal end of the shear pin 250). Subsequent proximal translation of the collar 273 along the shear pin (when the shear pin 250 translates distally relative to the sun gear 244) can cause the one or more expandable features 272 to contract. Such expanding and contracting of the expandable features can assist with locking and unlocking, respectively, the mechanical joint. For example, expansion of the expandable features (e.g., radial expansion) within the mechanical joint can create precise alignment between the mating part 230 and the housing 224 and can eliminate clearances in the mechanical joint. In some embodiments, the expandable features 272 can include wedge-shaped split collars that expand around inner wedge-shaped collars 279. In the expanded state, the expandable features 272 can create a force against an inner wall of either the mating part through-hole 231 or locking channel 225 to assists with locking the position of the mating part relative to the housing 224. In some implementations, the shear pin 250 can be made out of a high strength steel and the expandable features 272 can be made out of a high strength steel that is lubricated for low friction (e.g., dry film, grease, etc.), however, other materials are within the scope of this disclosure. Furthermore, although the detent feature 266 is shown as a spherical ball, any number of a variety of features can be included in the expanding pin assembly 218 for controlling relative axial movement between the sun gear 244 and the shear pin 250 without departing from the scope of this disclosure.

As shown in FIGS. 2-3, the sun gear 244 can have a tubular shape and extend around a part of the shear pin 250. An inner surface 246 of the sun gear 244 can include inner threads that engage outer threads along an outer surface of the shear pin 250. As such, when the drive assembly 216 travels to the end of the inner chamber 226, the pin 257 can force the plunger 252 in the proximal direction thereby causing the detent feature 266 to depress into the shear pin 250 and allowing the sun gear 244 to rotate as the carrier 232 continues to rotate. Furthermore, due to the threaded engagement between the sun gear 244 and the shear pin 250, rotation of the sun gear 244 can cause the shear pin 250, which can be prevented from rotating, to translate and assist with expanding or retracting the expandable features 272.

For example, as shown in FIGS. 2 and 4, the pin driving assembly 214 can include an anti-rotation feature 275 that is secured relative to the housing 224 and to the shear pin 250 such that the anti-rotation feature 275 prevents rotation of the shear pin 250 relative to the housing 224 while allowing translation of the shear pin 250 relative to the housing 224. For example, the anti-rotation feature 275 can include an elongate shaft having a shaped profile (e.g., square, hexagonal, spline, etc.) that engages complimenting shaped openings in the housing 224 and shear pin 250. The anti-rotation feature 275 can include any number of a variety of shapes and profiles for preventing rotation of the shear pin 250 relative to the housing 224 without departing from the scope of this disclosure.

Figure 5A:
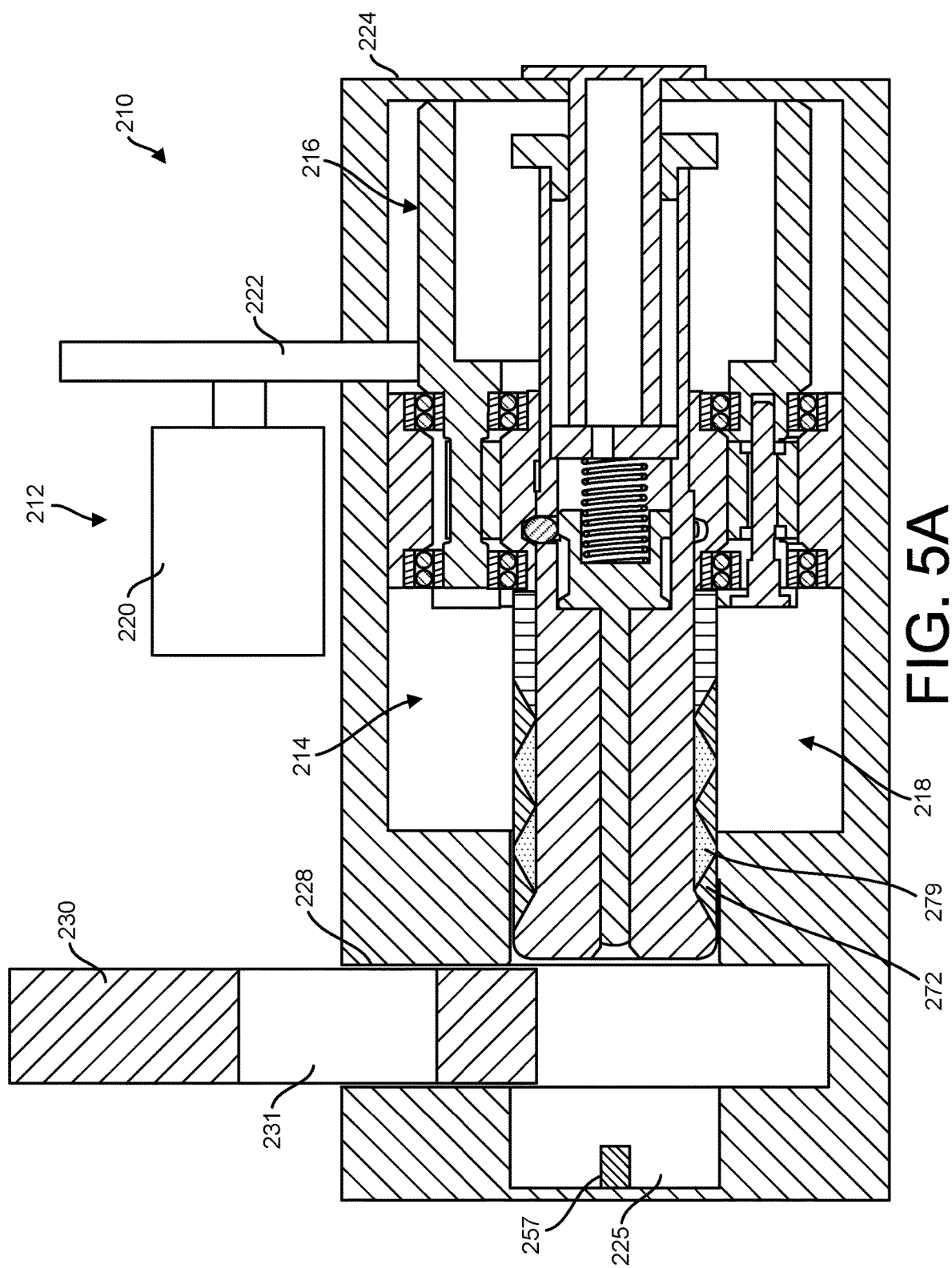
FIG. 5A illustrates a method of use of the expanding pin assembly of FIG. 2, including inserting a mating part into an opening of a housing of the expanding pin assembly.
Figure 5B:
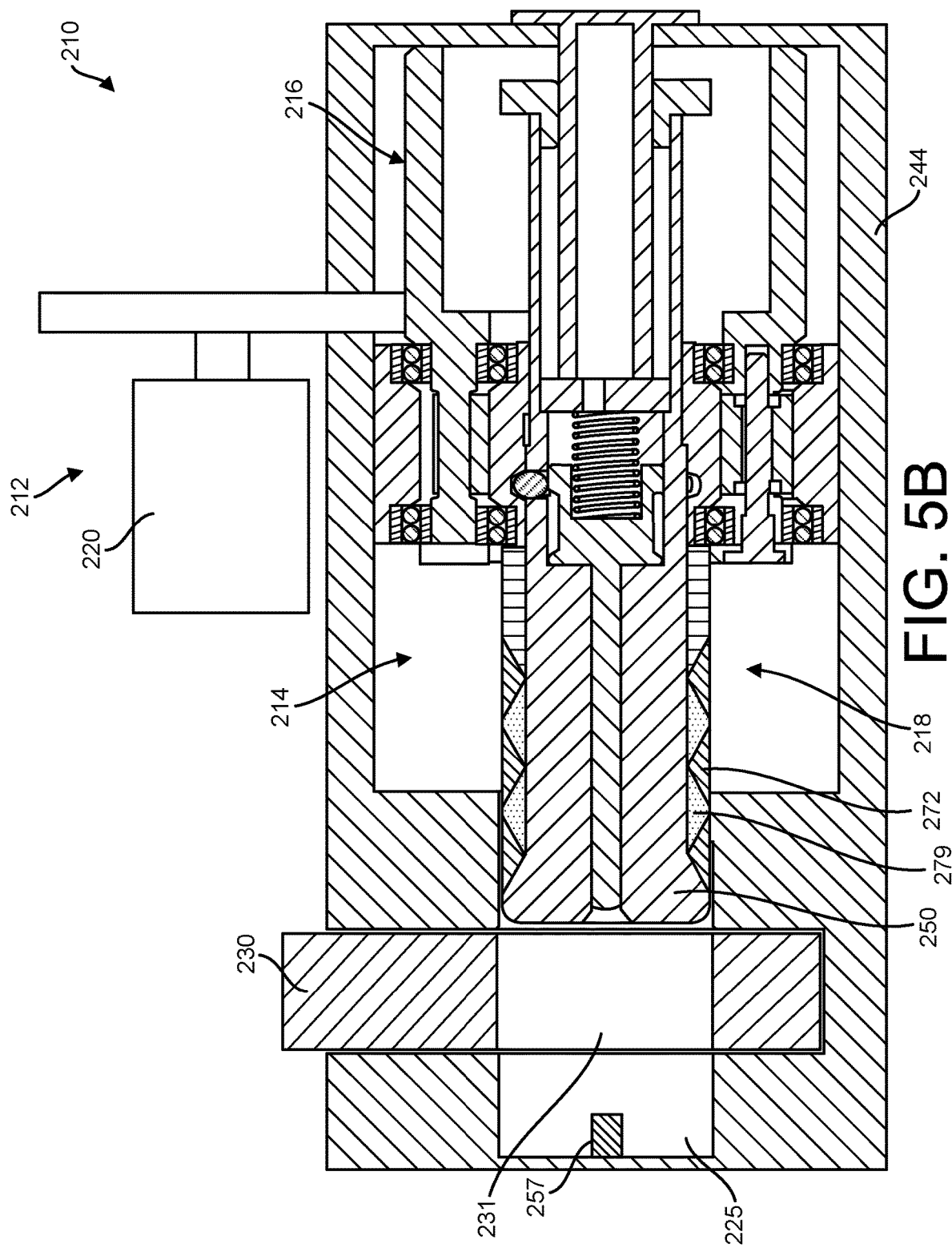
FIG. 5B illustrates a method of use of the expanding pin assembly of FIG. 2, including approximately aligning a mating part through-hole of the mating part with at least a shear pin of the expanding pin assembly.

FIGS. 5A-5D illustrate an example method of use of the expanding pin system 210 to lock the mating part 230 to the housing 244 thereby locking the associated mechanical joint. As shown in FIG. 5A, the expanding pin assembly 218 can start in an unlocked position to allow the mating part 230 to be advanced into the opening 228 of the housing 224. In the unlocked position, the shear pin 250 can be positioned such that it does not intersect the opening 228. This can allow the mating part 230 to be positioned in the housing and intersect a longitudinal axis of the shear pin 250, as shown in FIG. 5B. As also shown in FIG. 5B, the mating part 230 can include a mating part through-hole 231 that can be aligned with at least the shear pin 250. The housing 224 can include a locking channel 225 that is aligned with the shear pin 250 and intersects the opening 228 such that when the mating part 230 is positioned in the housing 224, the locking channel 225, mating part through-hole 231, and shear pin 250 can be approximately aligned, as shown in FIG. 5B. Once approximately aligned, the actuation assembly 212 can be actuated to lock the mechanical joint, as will be described in greater detail with reference to FIGS. 5C and 5D.

Figure 5C:
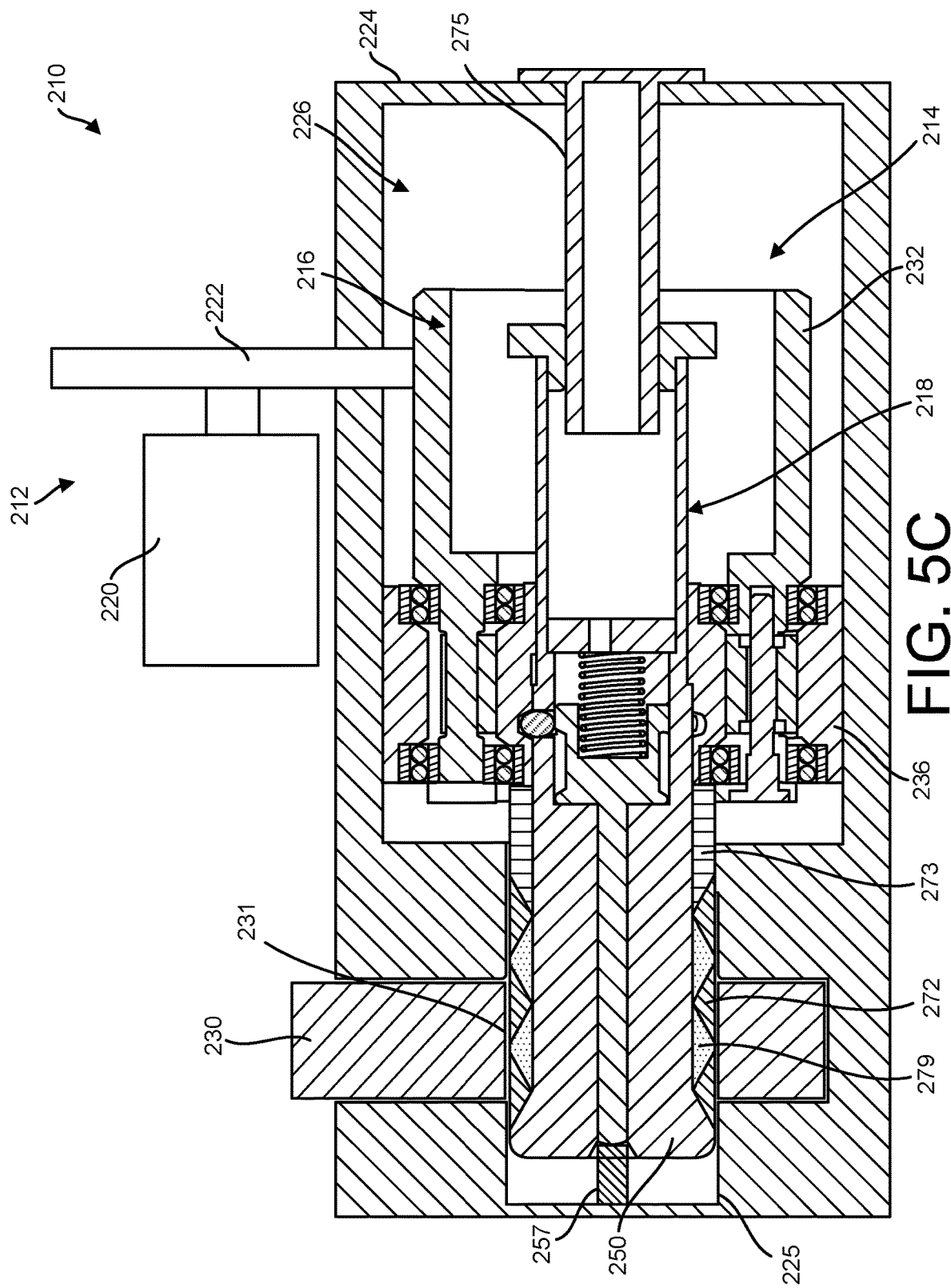
FIG. 5C illustrates a method of use of the expanding pin assembly of FIG. 2, including actuating the actuation assembly to cause the shear pin to advance through the mating part through-hole of the mating part.
Figure 5D:
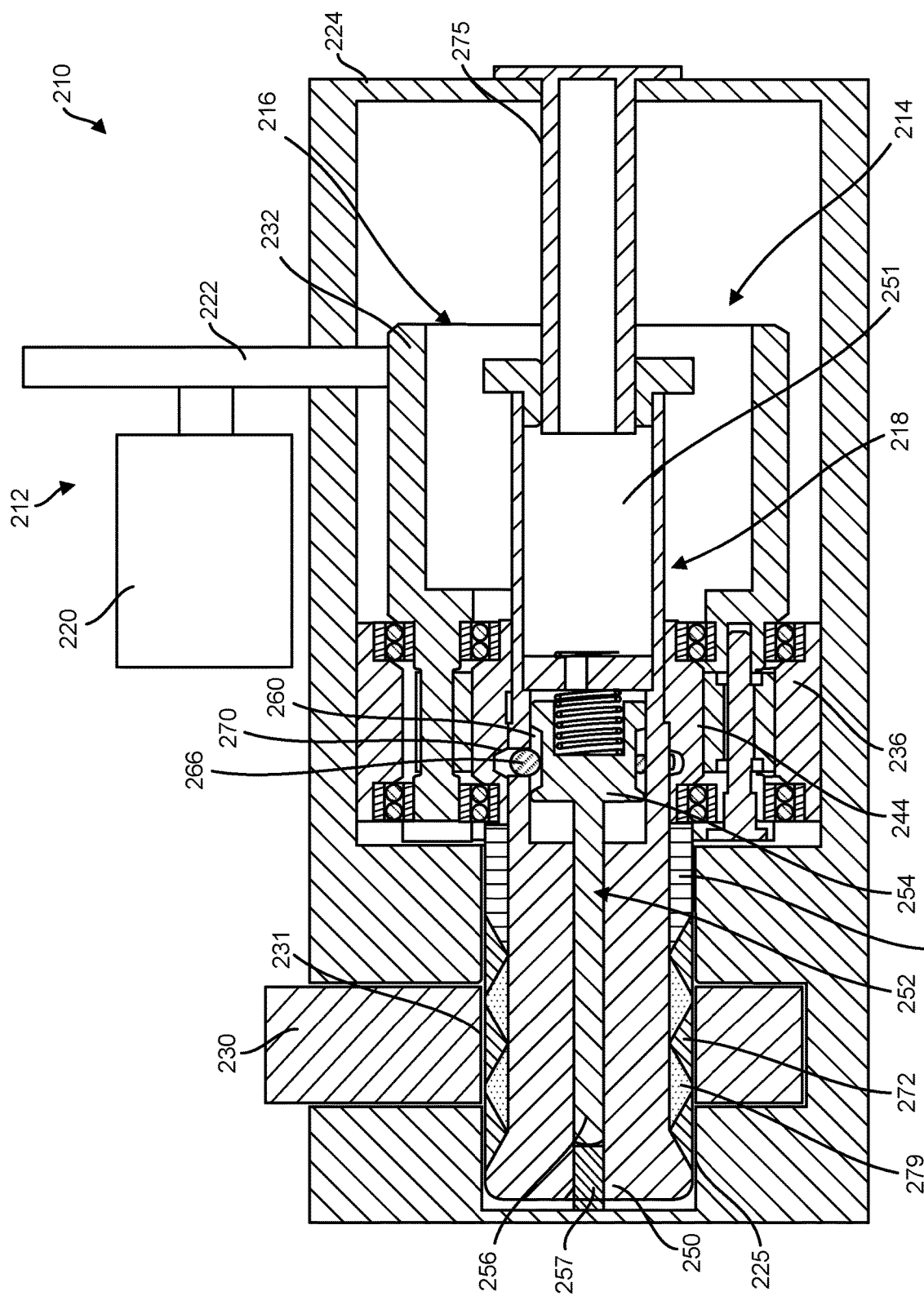
FIG. 5D illustrates a method of use of the expanding pin assembly of FIG. 2, including expanding the expandable features along the shear pin to precisely align the mating part to the housing and lock an associated mechanical joint.

As shown in FIG. 5C, the actuation assembly 212 can be actuated such that the actuator 220 causes the actuation coupler 222 to provide the first output thereby causing the carrier 232 to rotate in the first direction. As discussed above, rotation of the carrier 232 in the first direction can cause the ring gear 236 to rotate and threadably engage the inner chamber 226 of the housing 224 to thereby advance the drive assembly 216 and expanding pin assembly 218 in the distal direction, as shown in FIG. 5C. As the expanding pin assembly 218 advances in the distal direction, the distal end of the shear pin 250 having the expandable features 272 can be advanced along the locking channel 225 and through the mating part through-hole 231. The ring gear 236 can continue to be rotated by the rotating carrier 232 until, for example, the distal end of the drive assembly 216 reaches the distal end of the inner chamber 226 thereby preventing further travel of the drive assembly 216 in the distal direction. In this position, the ring gear 236 can be prevented from rotating due to the threaded engagement between the ring gear and the housing and the inability to further travel distally. Furthermore, in this position, the pin 257 can be engaged with a distal end of the expanding pin assembly such that the pin 257 applies a force to a distal end of the plunger 252 thereby proximally moving the plunger and releasing the detent feature 266 (e.g., detent feature 266 depressed into shear pin 250). At this state, continued rotation of the carrier 232 in the first direction causes rotation of the sun gear 244 due to the released detent feature 266, as shown in FIG. 5D. As discussed above, the sun gear 244 can be threadably engaged with the shear pin 250, which is rotationally restrained by an anti-rotation feature 275, such that rotation of the sun gear 244 when the detent feature 266 is released can cause the shear pin 250 to longitudinally translate.

As shown in FIG. 5D, when the actuation assembly 212 is actuated for locking the mechanical joint (e.g., the actuation coupler 222 provides a first output), the sun gear 244 can be caused to rotate in a direction that translates the shear pin 250 relative to the sun gear 244 and in the proximal direction. A collar 273 positioned proximal to the expandable features 272 and distal to the sun gear 244 can be prevented from moving in the proximal direction along with the shear pin 250 (e.g., due to the sun gear 244 remaining stationary as the shear pin 250 proximally translates) thereby moving the collar 273 distally along the shear pin 250 and causing expansion (e.g., radial expansion) of the expandable features 272. The expandable features 272 can be positioned such that expansion of the expandable features 272 can precisely align the mating part 230 relative to the housing 224 and securely lock the mechanical joint.

After the expandable features 272 have been properly expanded to lock the mechanical joint, the actuation assembly 212 can be deactivated. In some implementations, for example, de-activation of the actuation assembly 212 can be based on a sensed torque in the actuator 220 or after a defined number of rotations of the actuator 220 (e.g., measured by a resolver). Other parameters can be used to determine when to deactivate the actuation assembly 212 without departing from the scope of this disclosure.

To unlock the mechanical joint, the actuation assembly 212 can be activated to cause the actuation coupler 222 to provide a second output thereby causing the carrier 232 to rotate in the second direction. Rotation of the carrier 232 in the second direction can cause the sun gear 244 to rotate to cause the shear pin 250 to move distally thereby radially contracting the expandable features 272 as a result of the collar 273 moving proximally along the shear pin 250. Continued rotation of the carrier 232 in the second direction can cause the ring gear 236 to rotate and travel in the proximal direction (e.g., due to threadable engagement between the ring gear 236 and the inner chamber 226 of the housing 224) thereby causing the drive assembly 216 and the expanding pin assembly 218 to travel in the proximal direction. This can cause the shear pin 250 to retract from the mating part through-hole 231 and allow the mating part 230 to move relative to the housing 224, including retracting from the opening 228 in the housing 224. Additionally, proximal translation of the expanding pin assembly 218 can disengage the pin 257 from the distal end of the expanding pin assembly 218 thereby allowing the plunger 252 to return to the distal position and re-engage the detent feature 266 with the sun gear 244. The extruded lip 262 of the head 254 of the plunger 252 can include an angled end that encourages the detent feature into the engaged position. Such locking and unlocking of the mechanical joint can be performed any number of times using the expanding pin system.

In some embodiments, the expanding pin system 210 can include a motor velocity command. For example, a motor of the actuation assembly 212 can draw as much current as is required, up to a limit, to complete the insertion and expansion of the expanding pin assembly 218 (e.g., lock the mechanical joint). In some embodiments, a resolver can count the revolutions of the motor, which can be compared (e.g., using a processor of a computing device) to an estimated location of the shear pin 250 relative to the mechanical joint and expansion pre-load. This can be compared to the current drawing of the motor to determine torque and pre-load based on amount of expansion of the expandable features 272.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. An expanding pin system for releasably locking a mechanical joint associated with a deployable wing of an aircraft for releasably securing the deployable wing in a deployed position, the expanding pin system, comprising:
    an actuation assembly configured to provide a first output for locking the mechanical joint and a second output for unlocking the mechanical joint; and
    a pin driving assembly operably coupled to the actuation assembly, the pin driving assembly comprising:
        a drive assembly including a carrier operably coupled to the actuation assembly and an outer housing such that the carrier translates a first distance along the housing when the actuation assembly is actuated to provide the first output, the drive assembly further including a sun gear operably coupled to the carrier such that the sun gear is caused to rotate in a first direction after the carrier translates the first distance; and
        an expanding pin assembly operably coupled to the drive assembly such that the expanding pin assembly translates the first distance with the drive assembly thereby advancing an expandable part of the expanding pin assembly across at least a part of the mechanical joint, the expandable part being caused to expand when the sun gear rotates in the first direction,
        wherein the outer housing includes an inner chamber with an inner wall that is threadably engaged with a ring gear positioned around a distal end of the carrier such that rotation of the carrier causes rotation of the ring gear, and wherein rotation of the ring gear causes translation of the drive assembly and the expanding pin assembly relative to the outer housing.

2. The expanding pin system of claim 1, wherein the sun gear is configured to rotate in a second direction when the actuation assembly is actuated to provide the second output to thereby cause the expandable part to contract.

3. The expanding pin system of claim 1, wherein the carrier is configured to translate along the housing thereby causing the expandable part to retract from the mechanical joint when the actuation assembly is actuated to provide the second output.

4. The expanding pin system of claim 1, wherein the actuation assembly includes one or more of a DC brush motor, a DC brushless motor, a stepper motor, an AC motor, and a rotary hydraulic actuator.

5. The expanding pin system of claim 1, wherein the pin driving assembly further includes a detent feature that, when in an engaged position, is operatively coupled to both the drive assembly and the expanding pin assembly to thereby restrict translation of the expanding pin assembly relative to the drive assembly.

6. The expanding pin system of claim 5, wherein the detent feature, when in a disengaged position, is uncoupled from the drive assembly to thereby allow translation of the expanding pin assembly relative to the drive assembly.

7. The expanding pin system of claim 6, wherein the pin driving assembly further includes a plunger that is biased in a distal position within the pin driving assembly thereby causing the detent feature to be in the engaged position, and wherein the plunger causes the detent feature to be in the disengaged position when forced in a proximal position.

8. The expanding pin system of claim 7, wherein the housing further includes a pin aligned with a distal end of the plunger, and wherein the pin is configured to force the plunger from the distal position to the proximal position when the pin driving assembly engages the pin during distal translation of the pin driving assembly.

9. The expanding pin system of claim 1, wherein the expanding pin assembly further includes a shear pin that is rotationally restricted and threadably engaged with the sun gear such that rotation of the sun gear causes translation of the shear pin.

10. The expanding pin system of claim 9, wherein the expandable part is positioned along a distal end of the shear pin.

11. The expanding pin system of claim 10, wherein translation of the shear pin in a proximal direction relative to the sun gear causes the expandable part to expand.

12. The expanding pin system of claim 10, wherein translation of the shear pin in a distal direction relative to the sun gear causes the expandable part to contract.

13. The expanding pin system of claim 10, wherein the expandable part includes one or more bushings.

14. An expanding pin system for releasably locking a mechanical joint associated with a deployable wing of an aircraft for releasably securing the deployable wing in a deployed position, the expanding pin system, comprising:
an actuation assembly configured to provide a first output for locking the mechanical joint and a second output for unlocking the mechanical joint; and
a pin driving assembly operably coupled to the actuation assembly, the pin driving assembly comprising:
a drive assembly including a carrier operably coupled to the actuation assembly and an outer housing such that the carrier translates a first distance along the housing when the actuation assembly is actuated to provide the first output, the drive assembly further including a sun gear operably coupled to the carrier such that the sun gear is caused to rotate in a first direction after the carrier translates the first distance;
an expanding pin assembly operably coupled to the drive assembly such that the expanding pin assembly translates the first distance with the drive assembly thereby advancing an expandable part of the expanding pin assembly across at least a part of the mechanical joint, the expandable part being caused to expand when the sun gear rotates in the first direction;
a detent feature that, when in an engaged position, is operatively coupled to both the drive assembly and the expanding pin assembly to thereby restrict translation of the expanding pin assembly relative to the drive assembly, the detent feature, when in a disengaged position, being uncoupled from the drive assembly to thereby allow translation of the expanding pin assembly relative to the drive assembly; and
a plunger that is biased in a distal position within the pin driving assembly thereby causing the detent feature to be in the engaged position, and wherein the plunger causes the detent feature to be in the disengaged position when forced in a proximal position.

15. The expanding pin system of claim 14, wherein the sun gear is configured to rotate in a second direction when the actuation assembly is actuated to provide the second output to thereby cause the expandable part to contract.

16. The expanding pin system of claim 14, wherein the carrier is configured to translate along the housing thereby causing the expandable part to retract from the mechanical joint when the actuation assembly is actuated to provide the second output.

17. The expanding pin system of claim 14, wherein the actuation assembly includes one or more of a DC brush motor, a DC brushless motor, a stepper motor, an AC motor, and a rotary hydraulic actuator.

18. The expanding pin system of claim 14, wherein the outer housing includes an inner chamber with an inner wall that is threadably engaged with a ring gear positioned around a distal end of the carrier such that rotation of the carrier causes rotation of the ring gear, and wherein rotation of the ring gear causes translation of the drive assembly and the expanding pin assembly relative to the outer housing.

19. The expanding pin system of claim 14, wherein the housing further includes a pin aligned with a distal end of the plunger, and wherein the pin is configured to force the plunger from the distal position to the proximal position when the pin driving assembly engages the pin during distal translation of the pin driving assembly.

20. The expanding pin system of claim 14, wherein the expanding pin assembly further includes a shear pin that is rotationally restricted and threadably engaged with the sun gear such that rotation of the sun gear causes translation of the shear pin.

21. The expanding pin system of claim 20, wherein the expandable part is positioned along a distal end of the shear pin.

22. The expanding pin system of claim 21, wherein translation of the shear pin in a proximal direction relative to the sun gear causes the expandable part to expand.

23. The expanding pin system of claim 21, wherein translation of the shear pin in a distal direction relative to the sun gear causes the expandable part to contract.

24. The expanding pin system of claim 21, wherein the expandable part includes one or more bushings.

\* \* \* \* \*